United States Patent [19]
Phillips

[11] Patent Number: 6,029,532
[45] Date of Patent: Feb. 29, 2000

[54] GEARING COMMONALITY SYSTEM FOR GEAR REDUCERS

[75] Inventor: Allyn E. Phillips, Salem, S.C.

[73] Assignee: Reliance Electric Industrial Company, Cleveland, Ohio

[21] Appl. No.: 08/792,203

[22] Filed: Jan. 31, 1997

[51] Int. Cl.[7] .................................................. F16H 57/02
[52] U.S. Cl. ..................... 74/421 R; 74/421 A; 74/606 R
[58] Field of Search .................. 74/412 R, 414, 74/421 R, 421 A, 606 R; 403/1, 3, 4; 29/401.1, 434

[56] References Cited

U.S. PATENT DOCUMENTS

| | | | |
|---|---|---|---|
| 2,235,485 | 3/1941 | Jones, Jr. ............................... | 74/421 A |
| 2,596,794 | 5/1952 | Schmitter .............................. | 74/421 A |
| 2,888,831 | 6/1959 | Malcom ................................. | 74/421 R |
| 3,029,661 | 4/1962 | Schmitter .............................. | 74/421 A |
| 3,434,366 | 3/1969 | Raso et al. ............................ | 74/421 A |
| 3,771,381 | 11/1973 | Holzhauser et al. ................. | 74/421 R |
| 5,058,455 | 10/1991 | Nemoto et al. ....................... | 74/606 R |
| 5,067,361 | 11/1991 | Lachenmaier ..................... | 74/421 R X |
| 5,220,852 | 6/1993 | Shinoda et al. ....................... | 74/606 R |
| 5,842,377 | 12/1998 | Hutchings ............................... | 74/420 |

*Primary Examiner*—Charles A Marmor
*Assistant Examiner*—Ankur Parekh
*Attorney, Agent, or Firm*—John Miller; John Horn; Pat Yoder

[57] ABSTRACT

A gear reduction system is provided including two-stage gear reducers that may be converted to three-stage gear reducers by addition of a modular input stage. The modular input stage converts the input stage of the two-stage reducers to an intermediate stage of the three-stage reducers. Gearing, preferably including both drive pinions and driven gears, of the input stages of the two-stage reducers are used in the intermediate stages of the three-stage reducers, thereby reducing the overall number of parts needed for a family or series of reducers. Gearing is also common between input (and intermediate) stages of smaller gear reducers and modular input stages used with larger gear reducers, further reducing the number of different parts. The two-stage reducers and modular input stages of the three-stage reducers are preferably driven by modular transmission adapters that support the drive pinions of the input stages. The drive pinions of both the input stages and the intermediate stages are preferably shank-mounted to drive shafts of the transmission adapters or upstream reduction stages.

17 Claims, 9 Drawing Sheets

| [1] (MOTOR FROM INTERFACE) | (a) (SPACING ADAPTER) | [2] (ADAPTER / ADAPTER INTERFACE) | (b) (TRANS. ADAPTER) | [3] (GEAR REDUCER INTERFACE) |
|---|---|---|---|---|
| NEMA 56 /140 | a1 | I1 | b1 | C |
| NEMA 180 | a2 | | b2 | D |
| IEC 71 | a3 | | b3 | E |
| IEC 80 | a4 | | b4 | F |
| IEC 90 | a5 | | | |
| IEC 100 /112 | a6 | | | |
| NEMA 210 | a7 | I2 | b5 | D |
| NEMA 250 | a8 | | b6 | E |
| IEC 132 | a9 | | b7 | F |
| | | | b8 | G |
| | | | b9 | H |
| NEMA 280 | a10 | I3 | b10 | F |
| NEMA 320 | a11 | | b11 | G |
| NEMA 360 | a12 | | b12 | H |
| IEC 160 /180 | a13 | | b13 | I |
| IEC 200 | a14 | | b14 | J |
| IEC 225 | a15 | | b15 | K |
| IEC 250 | a16 | | | |

FIG. 10

GEARING COMMONALITY SYSTEM FOR GEAR REDUCERS

BACKGROUND OF THE INVENTION

The present invention relates generally to gear reducers for use in modifying the output speed and torque of a prime mover such as an electric motor. In particular, the invention relates to a gearing commonality system for modular gear reducers designed to enable gear sets or gears from one stage, particularly from an input stage of a multi-stage gear reducer, to be used in other stages, particularly intermediate stages, of gear reducers in a family or series of products.

Gear reducers of various construction are known for converting output speeds and torques of prime movers to desired speeds and torques for an intended application, such as driving conveyors, rotating machinery and the like. Generally, such gear reducers include one or more intermeshing gear sets arranged on a series of shafts between an input and an output. The input is designed to be coupled to a prime mover such as an electric motor, while the output, typically a keyed shaft or sleeve, is coupled to the machine application to be driven. Multiple gear sets may be employed for further reduction of the speed beyond the limits of a single gear set.

In gear reducers of the type described above, it is generally known to provide several stages of reduction gearing arranged in a modular fashion. In this type of gear reducer, a base reduction gear set is typically housed in the main portion of the gear reducer, while an additional reduction gear set may be added by interfacing an additional housing element onto the base housing, thereby interfacing the additional gear set with the base gear set or sets. The overall gear reduction of the resulting multi-stage gear reducer is then the product of the ratios of the successive gear reduction sets. Typically, two reduction gear sets are provided in a base gear reducer to afford a range of gear reduction, and a third gear reduction set is adapted for mounting to the two-stage base reducer to provide a three-stage gear reducing system.

In conventional multi-stage gear reducers, it is generally known to provide a range of drive pinion sizes for each gear reduction stage, each pinion being designed to intermesh with a corresponding range of driven gears for those stages. Depending upon the gear reducer design, some limited commonality may be afforded by providing common parts between a second or input stage of a two-stage gear reducer and a third or input stage of a three-stage gear reducer. In general, such modularity is highly desirable in the design of a family of gear reducers because it permits a wide range of overall reduction ratios to be offered without greatly expanding the number of different gearing elements used to form the modules of the system. However, known multi-stage gear reducers generally do not employ the same gearing support structure for an intermediate stage of a three-stage gear reducer as they do for the input stages of either a two-stage gear reducer or three-stage gear reducer. In particular, while the input stage of a multi-stage gear reducer typically includes a shank-mounted or motor shaft-mounted pinion protruding into the first gear reduction stage and supported on one end only, intermediate stages of three-stage modular gear reducers typically include a shaft common to the driven gear of the first stage (which is typically bored for mounting on the common shaft) and to the pinion of the second stage supported on either end or at locations along the shaft by a pair of bearings. Consequently, in modular gear reducers of heretofore known design, no gearing commonality was generally afforded between input stages of either a two- or three-stage modular reducers and intermediate stages of such reducers.

There is a need, therefore, for an improved modular gear reducer system wherein greater commonality can be achieved between various stages of the gear reduction modules. Moreover, there is a particular need for multi-stage modular gear reducers wherein gearing commonality can be provided between input stages of two or three-stage gear reducers and intermediate stages of gear reducers having three or more stages. There is a further need for a system designed to provide, where possible, commonality between pinions and gearing of input stages of both two- and three-stage gear reducers and intermediate stages of three-stage reducers.

SUMMARY OF THE INVENTION

The present invention features a gear reduction system designed to respond to these needs. In particular, the invention provides a construction technique configured to permit substantial commonality of gearing between various reduction stages. The system may be used for two, three or more stages of gear reduction and is particularly well suited to modular systems wherein gear reduction stages may be combined to provide an overall gear reduction ratio that is a product of the combined stages.

Thus, in accordance with a first aspect of the invention, a modular gear reduction system includes a reduction base unit and a modular input stage. The reduction base unit has an input stage and at least one additional stage. The input stage includes a first drive pinion and a first driven gear intermeshing with the first drive pinion. The additional stage has a second drive pinion coupled to the first driven gear of the input stage and a second driven gear intermeshing with the second drive pinion. The modular input stage has a third drive pinion and a third driven gear intermeshing with the third drive pinion. The modular input stage is configured for coupling to the reduction base unit to convert the input stage of the reduction base unit to an intermediate reduction stage incorporating the first drive pinion. Commonality is thus provided between the input stage of the base unit and the intermediate stage of the multi-stage reducer made up of the modular input stage and the base unit.

In accordance with another aspect of the invention, a gear reduction system includes a two-stage gear reducer and a three-stage gear reducer forming a family of reducers. The two-stage gear reducer has a first input stage and a first output stage. The first input stage includes a first drive pinion and a first driven gear intermeshing with the first drive pinion. The first output stage includes a second drive pinion and a second driven gear intermeshing with the second drive pinion. The three-stage gear reducer has a second input stage, an intermediate stage and a second output stage. The second input stage includes a third drive pinion intermeshing with a third driven gear, while the intermediate stage includes a fourth drive pinion intermeshing with a fourth driven gear, and the second output stage includes a fifth drive pinion intermeshing with a fifth driven gear. The first drive pinion of the two-stage gear reducer is substantially similar to the fourth drive pinion of the intermediate stage of the three-stage gear reducer. In a particularly preferred embodiment, the three-stage reducer is formed by the addition of a modular input stage to the two-stage reducer.

The invention also provides a gear reduction system that includes first and second gear reducers of different sizes, as well as first and second modular input stages for coupling to the first and second gear reducers, respectively. The first gear reducer has a first gear reduction stage including a first drive pinion and a first driven gear, and a second gear reduction stage coupled to the first gear reduction stage and including a second drive pinion and a second driven gear. The first modular input stage includes a third drive pinion and a third driven gear. The first modular input stage is configured for coupling to the first gear reducer, whereby the first gear reduction stage is converted to a first intermediate gear reduction stage. The second gear reducer has a fourth gear reduction stage including a fourth drive pinion and a fourth driven gear, and a fifth gear reduction stage coupled to the fourth gear reduction stage and including a fifth drive pinion and a fifth driven gear. The second modular input stage includes a sixth drive pinion and a sixth driven gear, and is configured for coupling to the second gear reduction unit to convert the second gear reduction unit, whereby the fourth gear reduction stage is converted to a second intermediate gear reduction stage. The first drive pinion is used in both the first gear reduction stage and the first intermediate gear reduction stage and is substantially similar to the sixth drive pinion. Substantial commonality is thereby provided in the overall system, particularly where a number of different gear reducers and modular input stages are provided.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENTS

Figure 1:
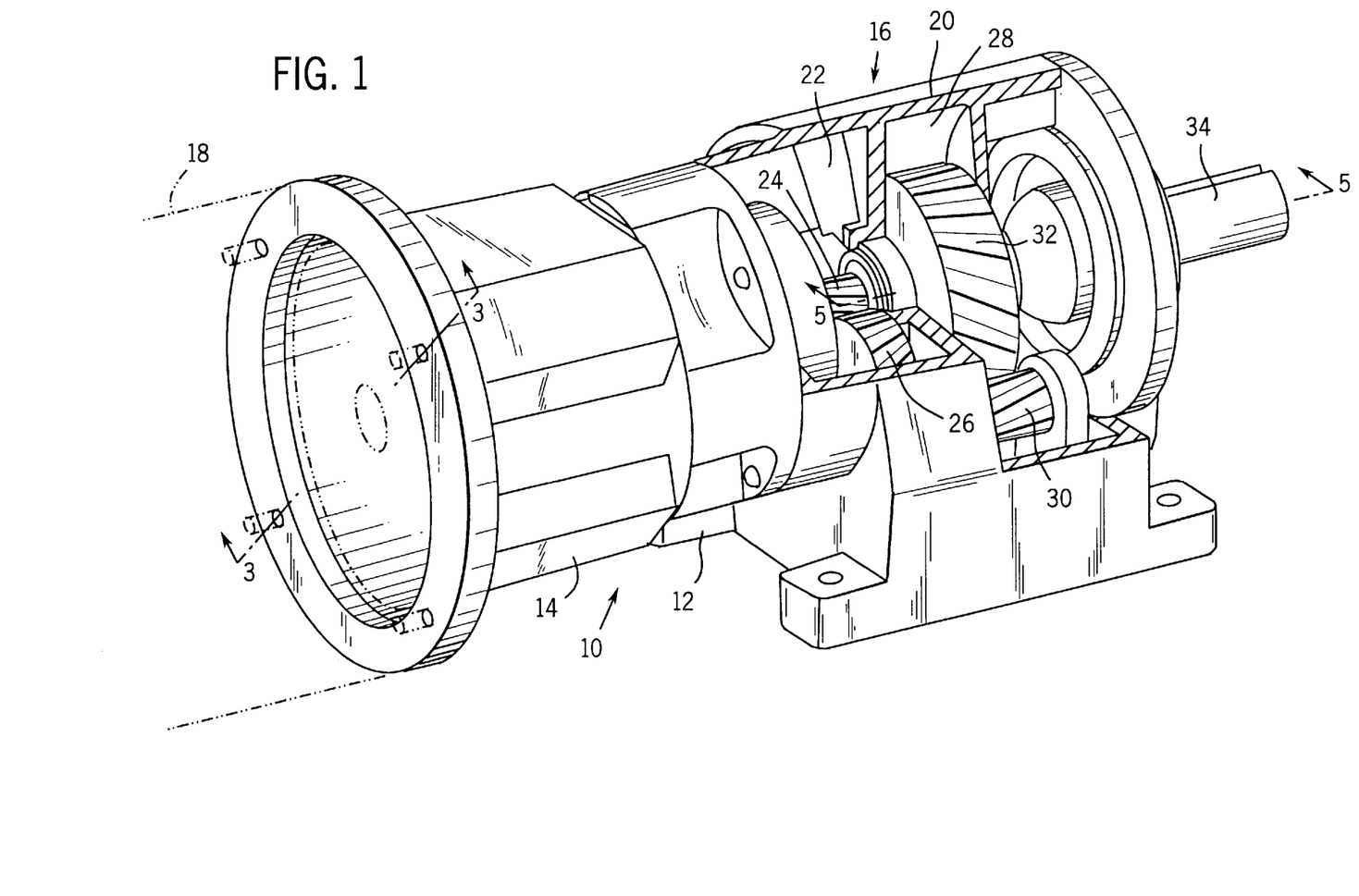
FIG. 1 is a partially cut-away perspective view of a two-stage gear reducer including a transmission and spacing adapter arrangement for coupling the gear reducer to an electric motor.

Turning now to the drawings and referring to FIG. 1, an adapter system 10, including a transmission adapter 12 and a spacing adapter 14, is illustrated for coupling a two-stage gear reducer 16 to a prime mover 18, such as an electric motor (shown in broken lines). In the embodiment illustrated in FIG. 1, gear reducer 16 includes a housing 20 to which transmission adapter 12 is mounted. Transmission adapter 12 interfaces with an input stage 22 of gear reducer 16 and supports a drive pinion 24 for input stage 22. Pinion 24 meshes with a driven gear 26 for the input stage gear reduction. Adjacent to input stage 22 within housing 20, an output gear reduction stage 28 includes a drive pinion 30, mounted to rotate with gear 26 of input stage 22. Pinion 30 meshes with a driven gear 32 in output stage 28, and is mounted on an output shaft 34, configured for coupling to a driven load (not shown). As will be appreciated by those skilled in the art, each stage of gear reducer 16 provides a reduction ratio determined by the relative sizes of their pinions and driven gears, with the overall reduction ratio of reducer 16 being the product of the reduction ratios of the input and output stages. The preferred construction of input and output stages 22 and 28 will be described in greater detail below.

Figure 2:
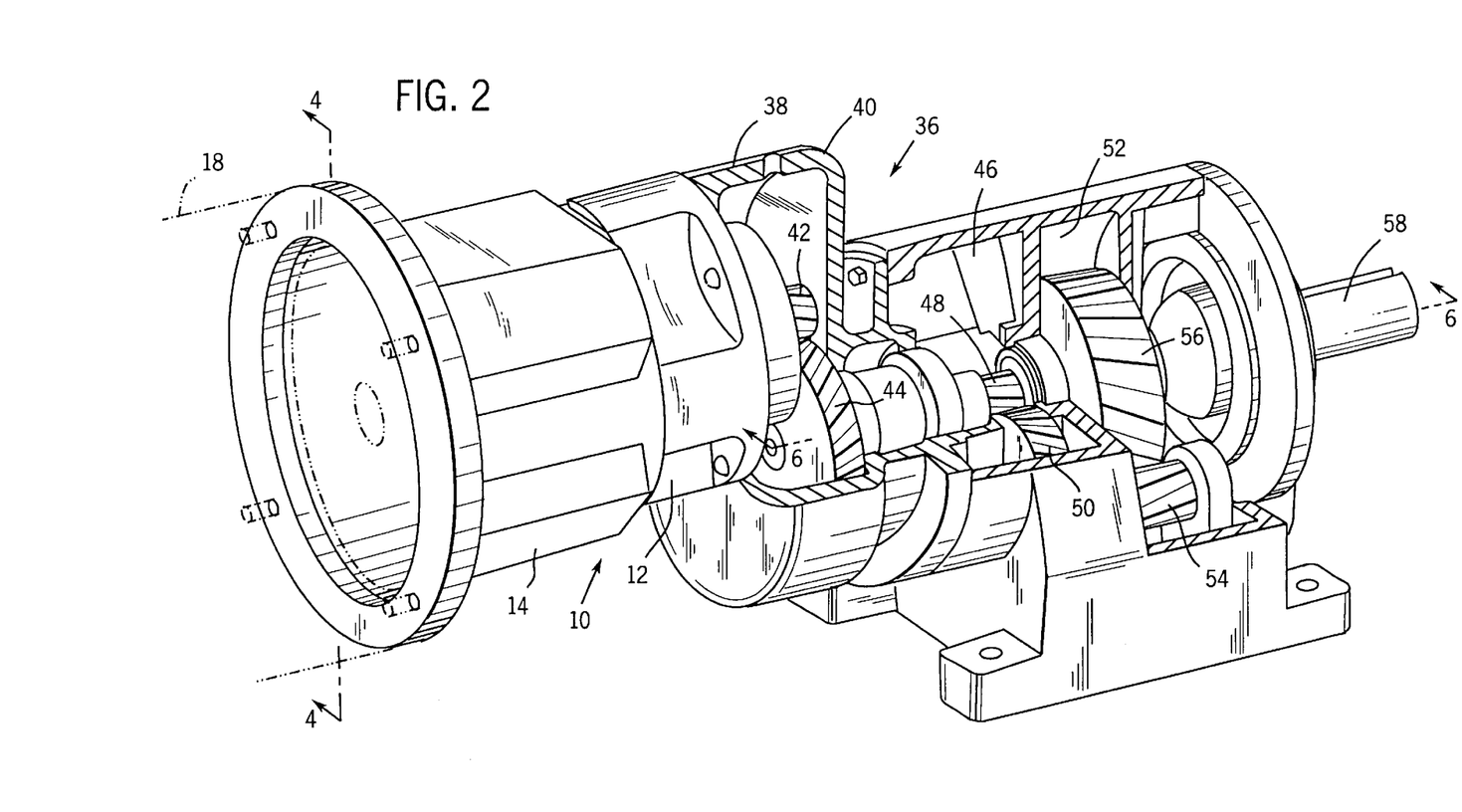
FIG. 2 is a partially cut-away perspective view of a three-stage gear reducer similar to that shown in FIG. 1, but including a modular intermediary stage coupled between the base gear reducer and the transmission adapter.

FIG. 2 illustrates adapter system 10 coupled to a three-stage gear reducer 36. While the elements of adapter system 10 are generally identical to those illustrated in FIG. 1, three-stage gear reducer 36 includes a modular input stage 38 coupled between transmission adapter 12 and two-stage gear reducer 16 to provide additional gear reduction. In the preferred embodiment illustrated, modular input stage 38 includes a housing 40 configured to interface directly with transmission adapter 12 and housing 20 of two-stage gear reducer 16. Housing 40 supports a drive pinion 42, which, as in the two-stage gear reducer 16 described above, is preferably supported by transmission adapter 12, and meshes with a driven gear 44. It should be noted that, when modular input stage 38 is mounted to two-stage gear reducer 16 to add a third stage of gear reduction, input stage 22 of the two-stage arrangement forms an intermediate gear reduction stage 46 driven by input stage 38. Thus, driven gear 44 of modular input stage 38 is commonly mounted in rotation with a drive pinion 48 of intermediate stage 46. Pinion 48, in turn, meshes with driven gear 50, which drives an output stage 52, including a drive pinion 54, commonly mounted in rotation with driven gear 50, and a driven gear 56 mounted on an output shaft 58. Those skilled in the art will appreciate that the overall reduction ratio of three-stage gear reducer 36 is the product of the reduction ratio of input, intermediate and output stages, 38, 46 and 52, respectively.

As described in greater detail below, the modular construction of adapter system 10, and two and three-stage gear reducers 16 and 36 affords assembly of a number of different combinations of individual elements capable of offering a wide range of power ratings and overall gear reduction ratios. In particular, several spacing adapters 14 are preferably provided in a series or family designed to interface with a number of electric motor frame sizes and to provide sufficient spacing and torque-carrying capacity for a range of transmission adapters 12. Several transmission adapters 12 are preferably provided for interfacing either directly with an input stage of a two-stage gear reducer 16 or with a modular input stage 38, which in turn is coupled to a two-stage gear reducer to form a three-stage reducer 36. Moreover, it has been found that by providing for spacing and motor frame interface requirements in a spacing adapter 14, while accommodating power transmission parameters (e.g., torque, shaft length, shaft size, side loading of drive pinions) in a separate transmission adapter 12, the number of separate castings required to interface a full range of electric motors with gear reducers of different rations is considerably reduced. Furthermore, the modularity of gear reducers 16 and 36 permits considerable commonality between pinions and gears used in input and intermediate stages, further reducing the number of different parts required for construction of a large number of gear reducer packages.

Figure 3:
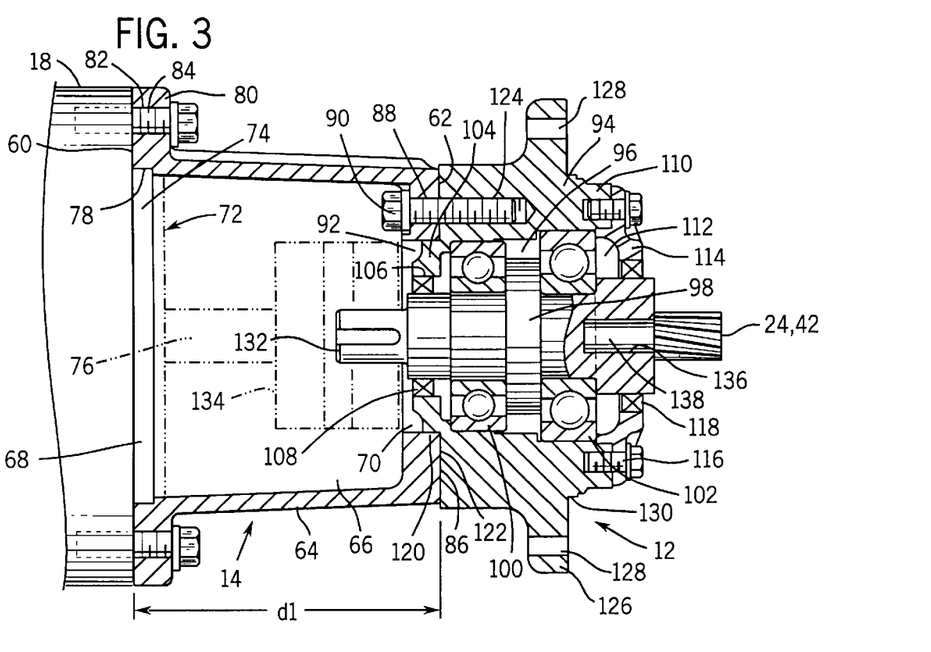
FIG. 3 is a sectional side view of the transmission and spacing adapter arrangement illustrated in FIGS. 1 and 2, sectioned along line 3—3 in those figures.
Figure 4:
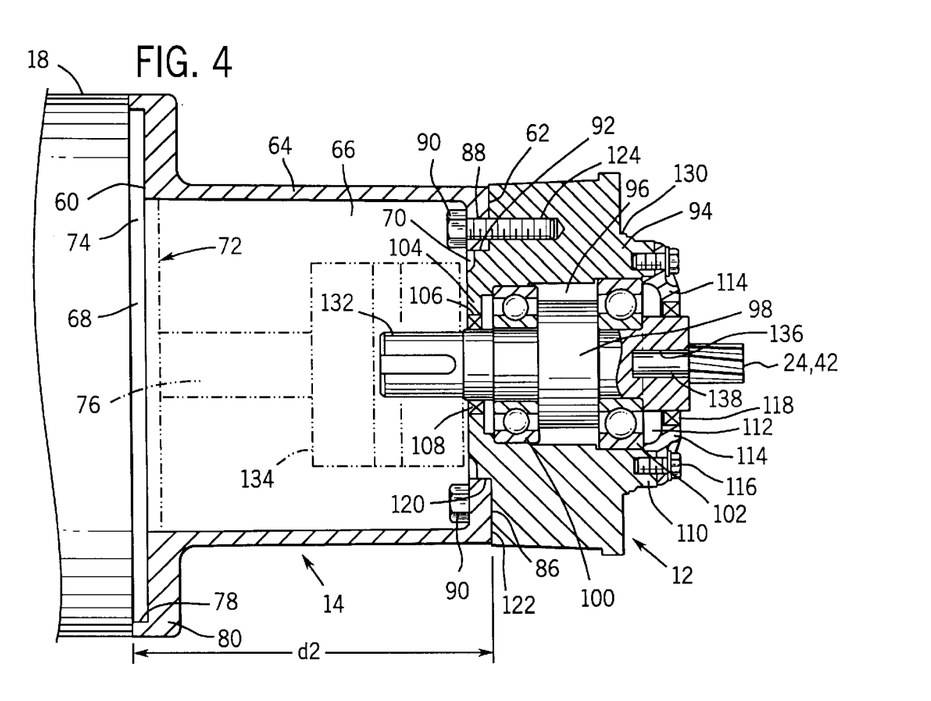
FIG. 4 is a sectional view through a transmission and spacing adapter arrangement similar to that shown in FIG. 3, illustrating a variant of the adapter arrangement to be included in a family of such adapters.

FIGS. 3 and 4 illustrate sectional views of differently sized and rated transmission adapters 12 and spacing adapters 14 in accordance with a presently preferred structure of adapter system 10. Referring first to spacing adapter 14, each adapter includes a first interface end 60 designed to contact the prime mover, such as a C-face electric motor 18, and a second interface end 62 configured for coupling to a transmission adapter 12. A side wall 64 extends between ends 60 and 62, providing mechanical support and spacing for motor 18 and transmission adapter 12, and enclosing an interior space 66 for transmission shafts and couplings. An opening 68 is provided in first end 60 and is machined to receive and center motor 18. A similar opening 70 is provided in second end 62 for receiving and supporting transmission adapter 12.

In the presently preferred embodiment illustrated, adapter 14 is configured to interface with electric motors having an industry standard C-face frame or IEC frame. Such frames include a frame interface, designated generally by the reference numeral 72, having a locating extension 74 surrounding the motor shaft 76. Opening 68 of adapter 14 includes a corresponding locating recess 78 appropriately dimensioned to allow for a slip fit of extension 74 therein and to provide necessary centering of motor shaft 76 within adapter 14. A peripheral flange 80 surrounds opening 68 and includes bolt holes 82 (one shown in FIG. 3) that receive bolts 84 for solidly coupling adapter 14 to motor 18. It should be noted that variations may exist for the particular configuration and placement of surfaces 60 and 78 which similarly assure concentricity and axial location of adapter 14 with respect to motor 18.

Second interface end 62 of spacing adapter 14 includes a locating surface 86, machined to provide alignment of transmission adapter 12 with motor frame interface 72. Bolt holes 88 are provided in locating surface 86 for receiving bolts 90 for solidly coupling spacing adapter 14 and transmission adapter 12 to one another. Opening 70 within end 62 is bounded by a machined locating and bearing surface 92, designed to receive and align transmission adapter 12 as described below.

Transmission adapter 12 includes a support housing 94 having an interior volume 96 for supporting a transmission shaft 98 in rotation via bearing sets 100 and 102. A first end 104 of housing 94 includes an opening 106, provided with a shaft seal 108 surrounding shaft 98. An opposite end 110 of housing 94 includes an opening 112 of sufficient dimensions to permit shaft 98 and bearing sets 100 and 102 to be inserted into housing 94 during assembly. An end plate 114 is provided over opening 112 and fixed to housing 94 via bolts 116. End plate 114 carries a second shaft seal 118, similar to seal 108. Alternatively, end plate 114 can be replaced by a snap ring or similar structure, and a shaft seal may not be required or used in all cases.

First end 104 of transmission adapter housing 94 forms an interface configured for coupling to second interface end 62 of spacing adapter 14 as shown in FIGS. 3 and 4. Thus, a locating and bearing extension 120 is formed on housing 94 that is appropriately dimensioned to slip within and bear against surface 92 of adapter 14. A flat end face 122 surrounding extension 120 bears against locating surface 86 of adapter 14 and is traversed by bolt holes 124 for receiving bolts 90. On opposite end 110, transmission adapter includes peripheral flange sections 126 (visible in FIG. 3) through bolt holes 128 are formed. Transmission adapter is thus mounted either directly to a two-stage gear reducer housing or to a modular input stage housing of a three-stage gear reducer via bolts (not shown) received through flange sections 126. A locating and bearing extension 130 is formed on transmission adapter housing 94 for properly locating and aligning adapter 12 with the input stage of a gear reducer when assembled.

In the presently preferred embodiment, transmission shaft 98 has a male shaft extension 132 extending into spacing adapter 14 for coupling to motor shaft 76 via a conventional shaft coupling 134. Alternatively, shaft 98 could be formed with a female end bore for receiving motor shaft 76, with side wall 64 of spacing adapter 14 being shortened accordingly. It should also be noted that in the embodiment illustrated, a bore 136 is formed in the end of shaft 98 protruding from end 110 of adapter 12. Bore 136 is appropriately dimensioned to receive and hold a shank 138 of a drive pinion 24 or 42 for an input stage 22 or 38 of a two or three stage gear reducer 16 or 36, respectively, as described in greater detail below. Alternatively, shaft 98 could be configured with a male extension over which a drive pinion could be pressed.

As noted above, transmission adapters 12 and spacing adapters 14 are preferably provided in a range of sizes and power ratings. Thus, as shown in FIGS. 3 and 4, one spacing adapter 14 in a family may provide a spacing d1 between motor 18 and transmission adapter 12, while another spacing adapter 14 will provide spacing d2. Moreover, interface ends 60 and 62 of spacing adapters 14 of different sizes accommodate a range of motor frame sizes and a corresponding range of transmission adapter ends 104. Similarly, transmission adapters 12 are designed in a family capable of offering a range of torque-carrying capacities (typically reflected in the diameter and length of shaft 98, the size of bearing sets 100 and 102 and the size and strength of housing 94). Transmission adapters 12 also provide for interfacing adapters 14 with gear reducer housings of various ratings. In a presently preferred family of adapters, it has been found that the separation of spacing and transmission adapter functions between two mating units, as compared to single-piece arrangements, permits reduction of the number of different housing castings making up the adapter system from 81 to 37, for the same range of drive motor frame sizes and gear reducer ratings.

Figure 5:
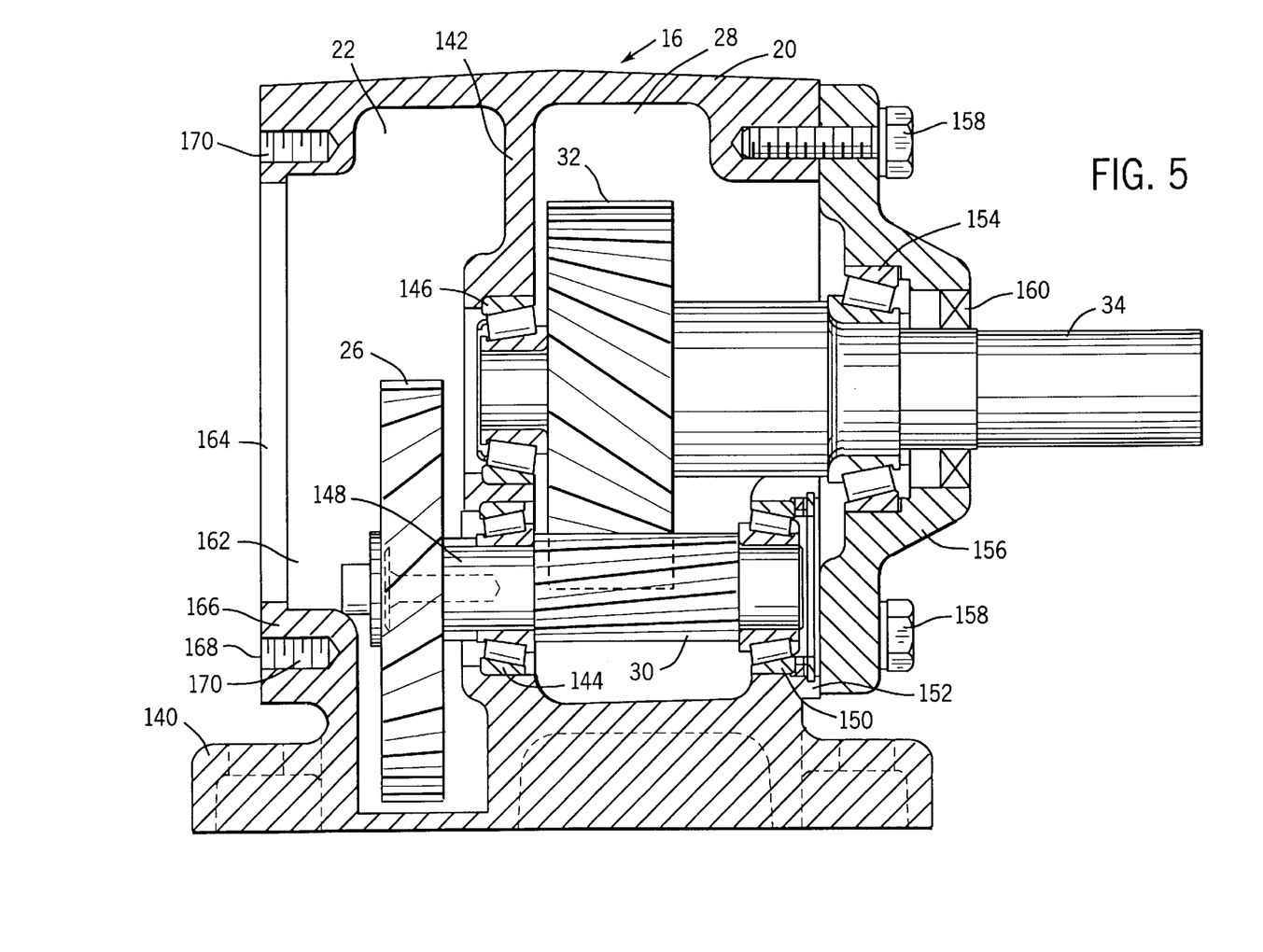
FIG. 5 is a sectional side view through the gear reducer illustrated in FIG. 1 along line 5—5 illustrating the internal configuration of the gear reducer designed to interface with the transmission adapter in accordance with one aspect of the invention.
Figure 6:
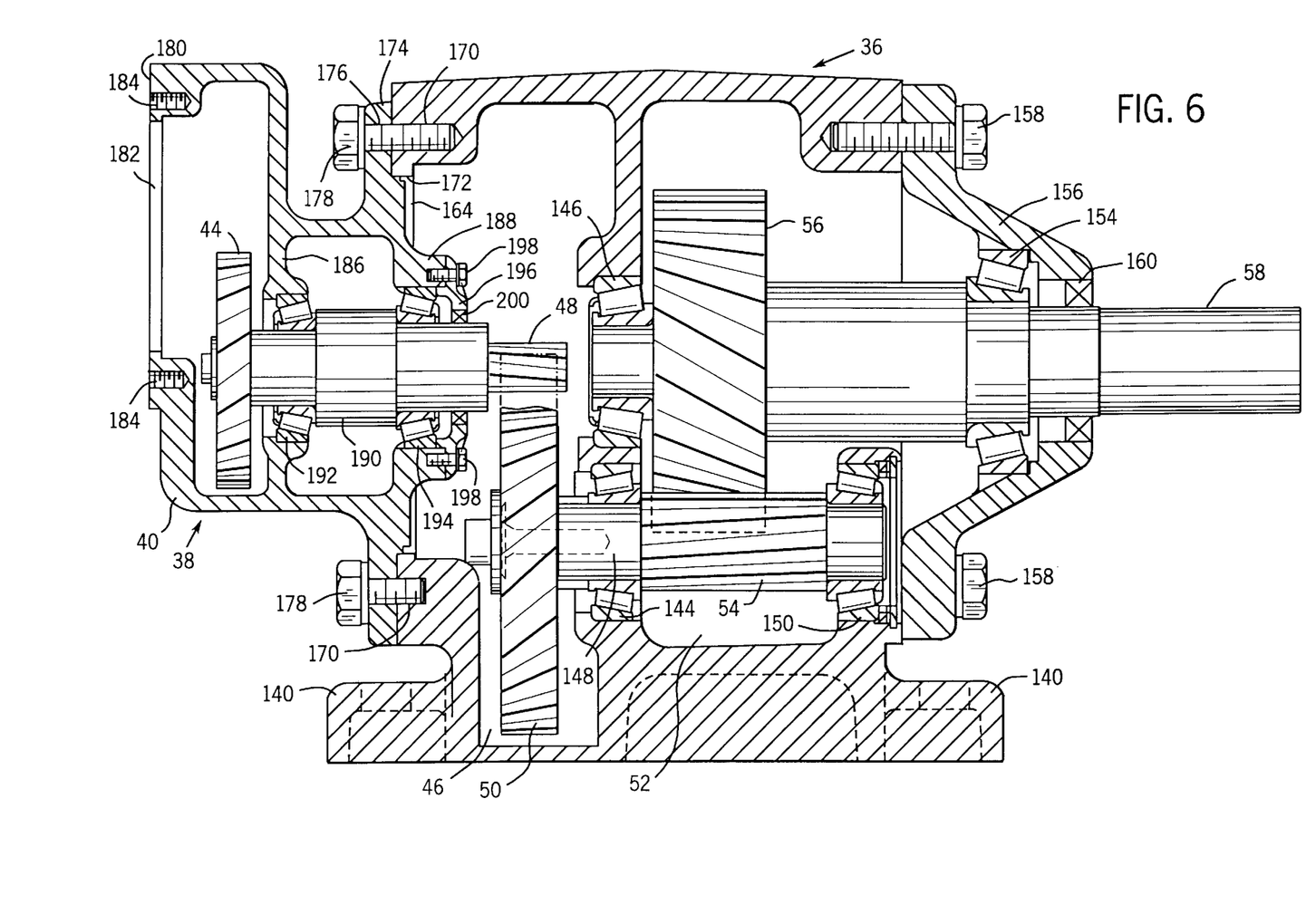
FIG. 6 is a sectional view through a three-stage gear reducer as illustrated in FIG. 2, taken along line 6—6 in that figure, illustrating the internal arrangement of a typical three-stage gear reducer designed to interface with a transmission adapter in accordance with the invention.
Figure 7:
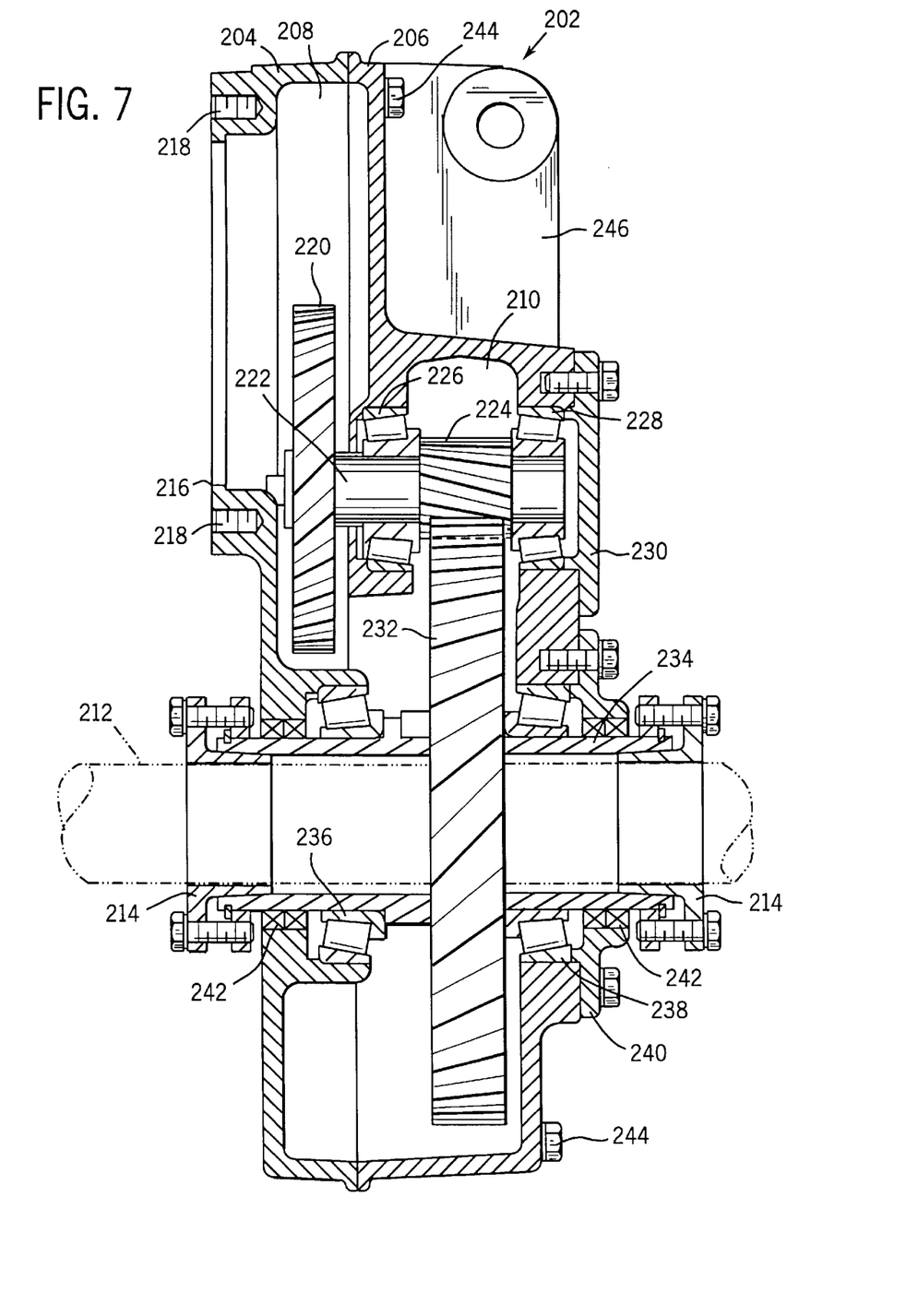
FIG. 7 is a sectional view through a different type of gear reducer designed to be used with the transmission adapter of the invention, wherein the gear reducer is designed for mounting on an input shaft supported on separate machinery.
Figure 8:
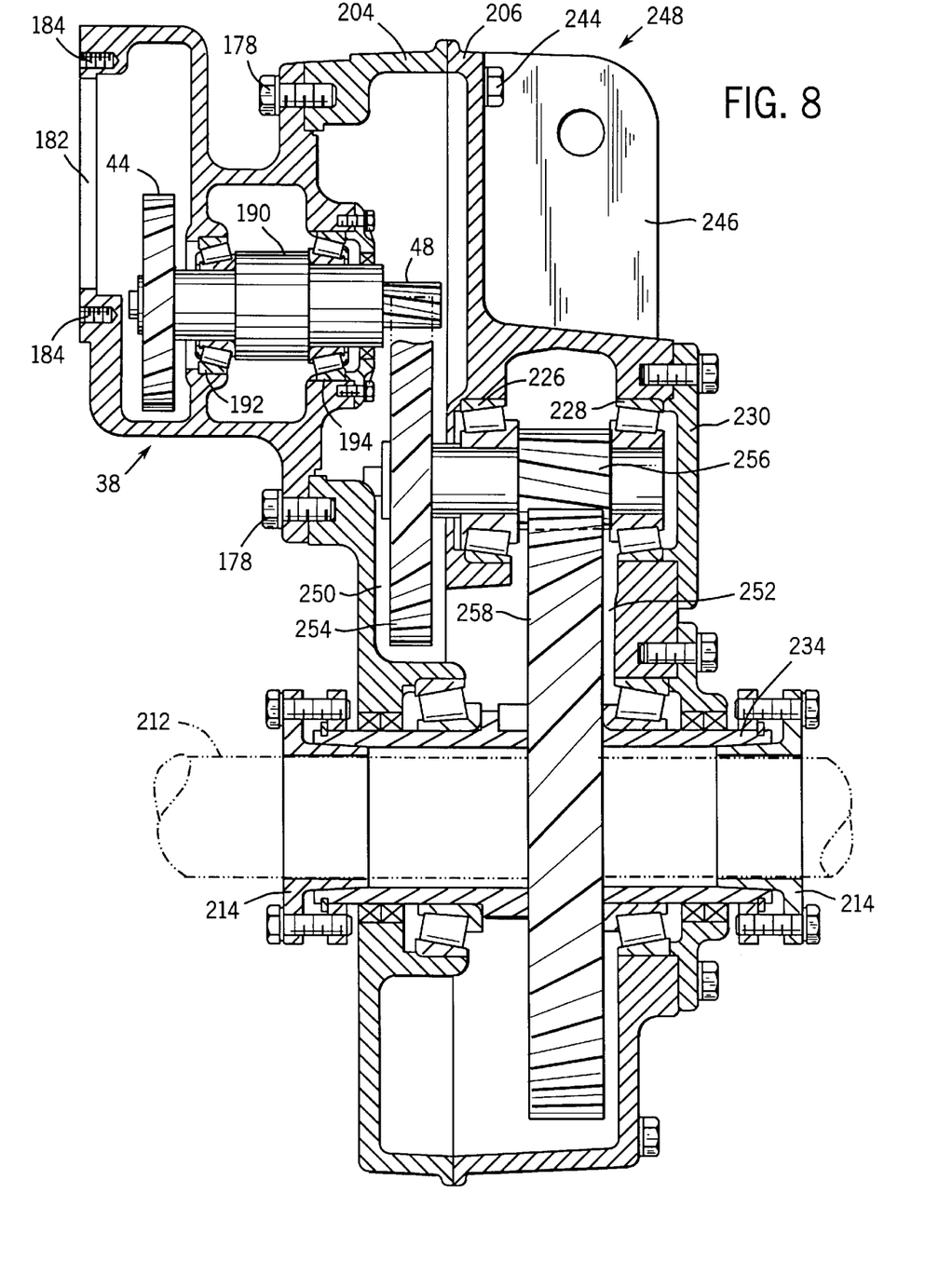
FIG. 8 is a sectional view through a shaft-mounted gear reducer similar to that illustrated in FIG. 7, but having a modular third stage mounted to the input of the gear reducer.

The presently preferred construction of two-stage and three-stage gear reducers 16 and 36 will now be described in greater detail, with particular reference to FIGS. 5–8. FIGS. 5 and 6 represent typical configurations of two and three-stage foot-mounted gear reducers in a preferred family of reducers, while FIGS. 7 and 8 represent shaft-mounted models for similar reducers. Turning first to FIG. 5, a two-stage gear reducer 16 is illustrated that is essentially identical to that shown in FIG. 1 and described above. As described above, gear reducer 16 includes an input stage 22 and an output stage 28 supported within a housing 20. The embodiment illustrated in FIG. 5 is a foot-mounted design including supporting feet 140 in the base of housing 20. A partition 142 within housing 20 defines the barrier between input and output stages 22 and 28, and supports bearing sets 144 and 146. Bearing set 144 supports an intermediate shaft 148 on which are fixed driven gear 26 of input stage 22 and drive pinion 30 of output stage 28. An opposite end of shaft 148 is supported by a second bearing set 150, secured within an end wall 152 of housing 20. Output shaft 34, on which output gear 32 is secured, is supported by bearing set 146 and by a second bearing set 154 secured within an end cover 156, which both closes an open end of housing 20 and supports loading of shaft 34. End cover 156 is secured to housing 20 by bolts 158 following assembly of gearing and bearings within housing 20. Alternatively, end cover 156 could also support bearing set 150 A shaft seal 160 is provided outboard of bearing set 154 for retaining lubrication and for preventing debris from entering housing 20.

In the presently preferred embodiment, housing 20 has an open end 162 adjacent to input stage 22 for receiving either a transmission adapter 12 having a drive pinion 24 supported thereon (see FIGS. 1, 3 and 4) to complete the two-stage reducer, or a modular input stage 38 of the type described above (see FIG. 2) to form a three-stage reducer (see FIG. 6 and the relevant description below). To receive and locate these elements, open end 162 of housing 20 has an annular locating and bearing surface 164 formed in an extension 166 thereof Locating and bearing surface 164 receives extension 130 of transmission adapter 12 (or a similar extension of modular input stage 38). Alternative locating means may be provided in lieu of locating surface 164, such as dowel pins or the like. A flat locating face 168 is provided on extension 166 and a series of bolt holes 170 are machined into face 168 for attachment of adapter 12 or input stage 38.

As illustrated in FIG. 6, a three-stage gear reducer 36 includes elements of an intermediate stage 46 and output stage 52 supported in essentially the same manner as described above for the two-stage gear reducer (with the exception of the housing and internal gearing, like elements are designated in FIG. 6 with the same reference numerals used in FIG. 5). In the presently preferred family of gear reducers, two-stage gear reducers 16 as shown in FIG. 5 serve as intermediate and output stages of three-stage gear reducers by addition of modular input stage 38. Thus, as shown in FIG. 6, each modular input stage 38 includes a housing 40 having a locating extension 172 configured to slip within annular locating surface 164 of two-stage reducer 16 (see FIG. 5). A peripheral flange 174 surrounding extension 172 includes bolt holes 176 for receiving bolts 178 solidly attaching input stage 38 in place.

On an opposite end, modular input stage 38 presents a flat locating face 180 having a central opening surrounded by a locating and bearing surface 182. Bearing surface 182 serves to receive and support a corresponding extension 130 of a transmission adapter 12 as described above. Bolt holes 184 are provided around bearing surface 182, corresponding to the placement of bolt holes 128 of transmission adapter 12, for securing these elements to one another via bolts (not shown).

Housing 40 is also provided with a partition 186 and an end wall 188 for supporting a shaft 190 in rotation via bearing sets 192 and 194. An open end of housing 40, through which bearing sets 192 and 194, and shaft 190 may be installed, is covered by an end plate 196, secured by bolts 198. Shaft 190 protrudes through end plate 196 and a shaft seal 200 is provided to retain lubricant in modular input stage 38.

In the presently preferred embodiment, shaft 190 supports drive pinion 48 for intermediate stage 46 in a manner identical to that described above with respect to shaft 98 of transmission adapter 12. Thus, shaft 190 includes a bore (not shown) for receiving a pinion 48 via a shank (see FIGS. 3 and 4). As mentioned above, an alternative to this preferred structure could include a shaft end of reduced diameter designed to receive a pinion wheel thereon.

When installed as illustrated in FIG. 6, modular input stage 38 presents drive pinion 48 in meshing engagement with driven gear 50 of intermediate stage 46. Pinion 48 is, in turn, mounted for rotation with driven gear 44 of input stage 38. To complete three-stage gear reducer 36, a transmission adapter 12, as described above with respect to FIGS. 3 and 4 would be installed so as to intermesh drive pinion 42 (see FIGS. 3 and 4) with driven gear 44.

It should be noted that the transmission arrangement described above for input stage 22 of two-stage gear reducer 16 is essentially identical to that of intermediate stage 46 of three-stage gear reducer 36. Moreover, the manner in which drive pinion 24, 42 is presented by transmission adapter 12 to either input stage 22 or to modular input stage 38 is essentially identical to the presentation of pinion 48 of intermediate stage 46 of three-stage gear reducer 36. This preferred structure presents several important advantages over heretofore known gear reducers. In particular, while known gear reducers may provide some modularity of input stages for conversion of a two-stage gear reducer to a three-stage reducer, they employ structures for supporting gearing of intermediate stages that are quite different from those used for gearing of input stages. The resulting structure affords little commonality between gearing of input stages of two or three-stage gear reducers and the intermediate stage of three-stage gear reducers.

In the foregoing structure, on the other hand, the similarity in structure between input stages and the intermediate stage 46 of three-stage gear reducer 36 permits a considerable degree of commonality in parts between these stages and a corresponding reduction in different parts required for the range of reducers. In particular, in the presently preferred embodiment, two and three stage gear reducers 16 and 36 share common drive pinions both between input stages 22 and 38, as well as between input stages 22, 38 and intermediate stage 46. Moreover, driven gears 26, 44 of input stages 22, 38, respectively (see FIGS. 5 and 6) are preferably identical to driven gears 50 of intermediate stage 46. The resulting gear reducer system permits a wide range of gear reduction combinations from a greatly reduced overall number of parts.

To further expand the number of gear reducer configurations utilizing the modular and common elements described above, several different models of gear reducers are presently envisioned, such as shaft-mounted models. FIGS. 7 and 8 illustrate such shaft mounted gear reducers including two stages and three stages, respectively. As shown in FIG. 7, a two-stage, shaft-mounted gear reducer 202 includes first and second mating housing elements 204 and 206, defining a first gear reduction stage 208 and a second stage reduction stage 210. Gear reducer 202 is configured for mounting on driven shaft 212 in a generally known manner, such as via tapered bushings 214. An opening is provided in housing element 204, surrounded by a locating and bearing surface 216 for receiving a transmission adapter 12 of the type described above with reference to FIGS. 3 and 4. A series of bolt holes 218 are provided around surface 216 for securing transmission adapter 12 to housing element 204. As described above, transmission adapter 12 carries an input drive pinion 24 which, in the case of reducer 202, meshes with a driven gear 220 of input stage 208. Gear 220 is mounted on a common shaft 222 with a drive pinion 224 for second stage 210. Gear 220, shaft 222 and pinion 224 are mounted for rotation within reducer 202 via bearing sets 226 and 228. Housing element 206 includes an opening through which bearing sets 226, 228, and shaft 222 may be installed. A cover plate 230 is fixed to housing element 206 following assembly of reducer 202.

Output stage 210 includes drive pinion 224 in meshing engagement with a driven gear 232. Driven gear is mounted for rotation with a structural sleeve 234 which, in turn, is rotatably supported by a pair of bearing sets 236 and 238. An annular cover plate 240 covers an opening in housing element 206 through which bearings 236, 238 and sleeve 234 may be installed. Shaft seals 242 are provided about ends of sleeve 234 to retain lubricant and to prevent intrusion of debris into gear reducer 202. Housing elements 204 and 206 are then secured to one another by means of bolts 244. To prevent rotation of reducer 202 with shaft 212, an attachment flange 246 is provided extending from housing element 206, which, upon installation, may be attached to a non-rotating machine element or support structure (not shown). It should be noted that alternatives to the foregoing structure include the elimination of cover plates 230 and 240 and the combination of elements 204 and 206 into a single housing unit or a multiple-piece housing joined differently than shown.

As described above for the foot-mounted two and three-stage gear reducers, the modularity and gearing commonality features of the present gear reducer system permit assembly of three-stage gear reducers 248, as shown in FIG. 8, wherein like reference numerals designate like elements from FIG. 7. In this three-stage assembly, input stage 208 of a two-stage gear reducer serves as an intermediate stage 250 by addition of a modular input stage 38 of the type described above with reference to FIG. 6, with an output stage 252 being drivingly coupled to a structural sleeve 234. Intermediate stage 250 includes a drive pinion 48 of modular input stage 38 intermeshing with a driven gear 254. Output stage 252 includes a drive pinion 256 mounted on a common shaft with gear 254, and intermeshing with driven gear 258. All other elements of gear reducer 248 may be essentially identical to those of two-stage reducer 202 described above.

As will be appreciated by those skilled in the art, both two-stage gear reducer 202 and three-stage gear reducer 248 are interfaced with similar transmission adapters 12 for driving input stages 208 or 38, providing modularity in the input system for the family of reducers. Moreover, as with the foot-mounted models described above, gear sets in input stages 208 and 38, and intermediate stage 250 are preferably common, by virtue of the presentation of pinions 24, 42 of the input stages and pinion 48 of the intermediate stage.

Figure 9:
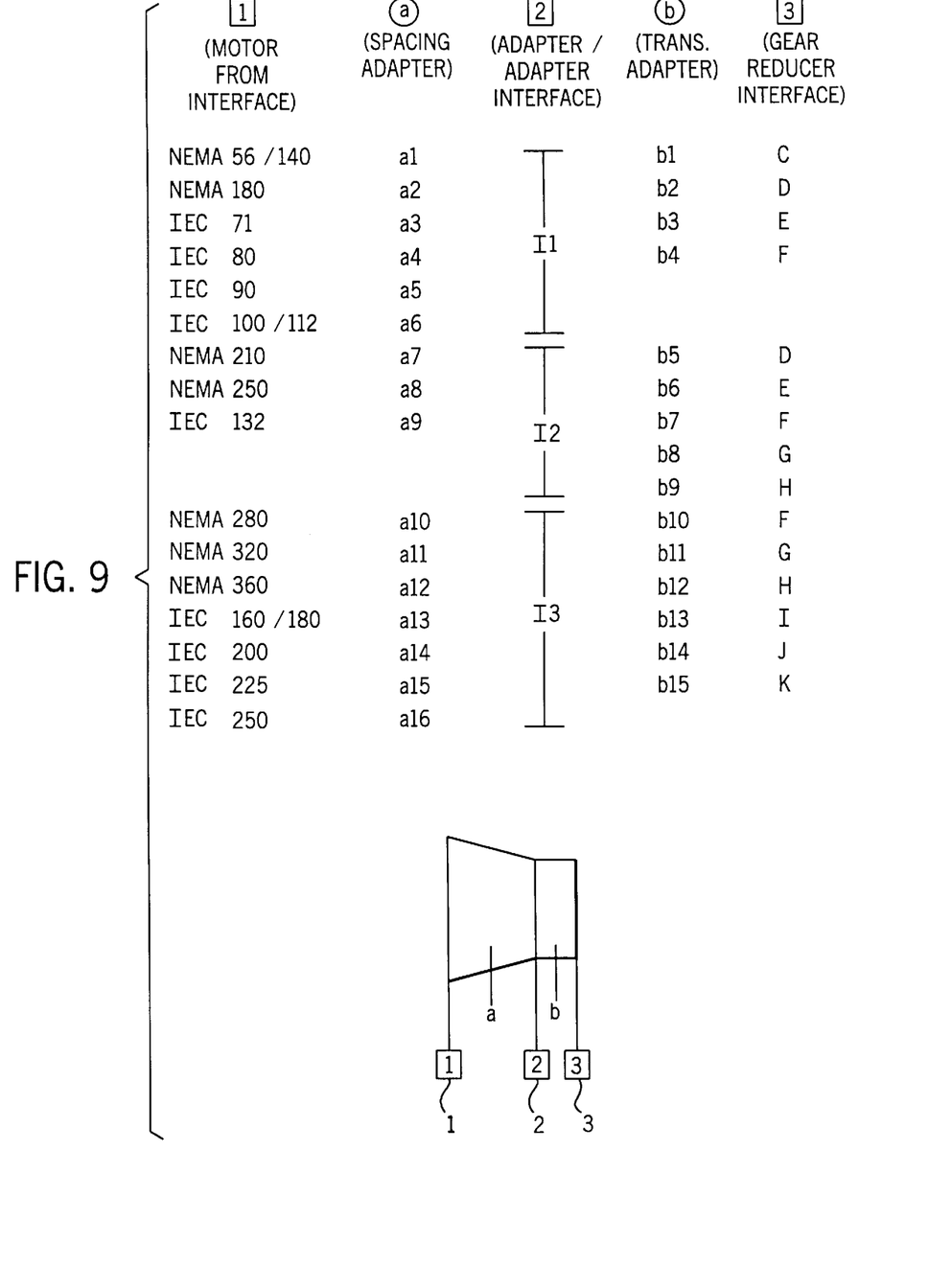
FIG. 9 is a tabulated presentation of the preferred modular input system interface architecture for mating spacing and transmission adapters with a large number of motor and gear reducer frame sizes.

FIG. 9 represents tabulated interface data for a presently preferred family of spacing and transmission adapters of the type described above, for interfacing a range of electric motor frame sizes with a range of gear reducer frame sizes. The tabulated data of FIG. 9 is presented in columns representing motor frame sizes 1, defining the first interface for spacing adapters a. The interface configuration between spacing adapters a and transmission adapters b is shown in the center column. The range of gear reducer frame sizes, defining the gear reducer interface configurations, are presented in the right-most column, with each gear reducer frame size being designated by a letter, the letter C representing the smallest frame size and the letter K representing the largest frame size. Transmission adapters b are indicated in the column to the left of the gear reducer interface column.

As shown in FIG. 9, in the presently preferred family of adapters, a large range of motor frames, both NEMA and IEC standard sizes, are accommodated by a range of 16 different spacing adapters (a1–a16), each machined to interface with one or more motor frames. A similar range of transmission adapters are machined for gear reducer frame sizes C–K (adapters b1–b15). However, because spacing and transmission adapters are separable and neither interfaces directly with motors and gear reducers, the full range of necessary interfaces between the adapters may be provided with a considerably reduced number of different interface configurations. In the preferred family presented in FIG. 9, three such interface configurations are provided, namely, I1, I2 and I3. Within each adapter-to-adapter interface group, any spacing adapter a may be coupled to any transmission adapter b (although certain combinations will not generally be made due to mismatches between the motor size and the gear reducer rating). Thus, 31 separate housings or assemblies may be used to link the full range of motors and gear reducers, rather than the much greater number of adapters required for systems linking motors to gear reducers directly without intermediate interfacing.

Figure 10:
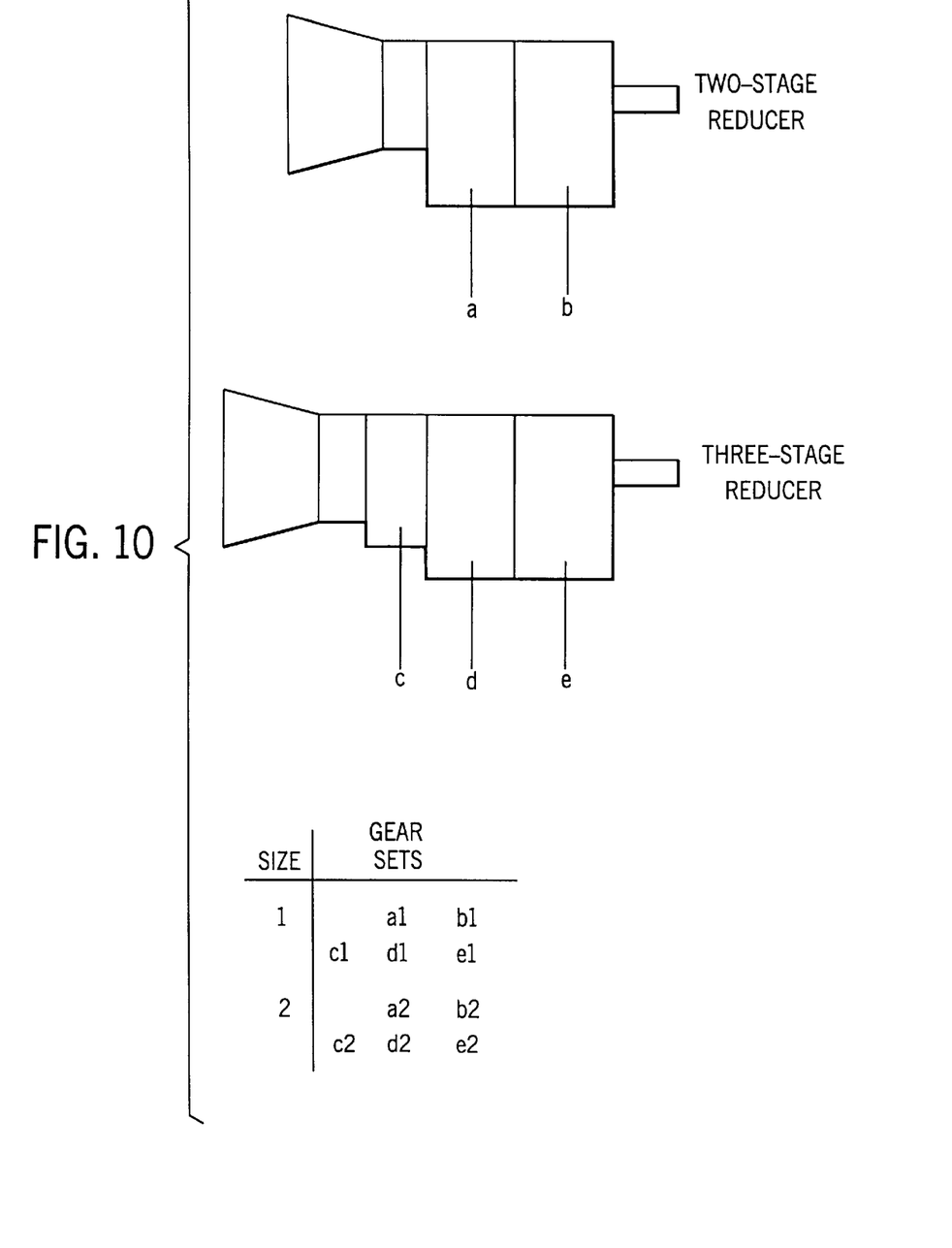
FIG. 10 is an exemplary schematic presentation of the gearing sets for two different sizes of two and three-stage gear reducers.

The gear commonality feature described above may be summarized as follows with reference to FIG. 10. FIG. 10 illustrates schematically the various gear sets included in two and three-stage gear reducers of the types described above. Schematically, two-stage gear reducers may be considered to include two gear sets a and b, with the drive pinion of the a set being presented via the transmission adapter 12 described above. Similarly, three-stage gear reducers may be considered to include three gear sets c, d and e, with gear set c being provided in a modular input stage of the type described above, and the drive pinion for the modular input stage being provided by a transmission adapter 12. As illustrated in FIG. 10, for two sizes of gear reducers 1 and 2 in the family of gear reducers constructed in accordance with the foregoing techniques, gear sets a–e may be represented as a1–e1, and a2–e2, for sizes 1 and 2, respectively (size 2 being larger than size 1). The gearing commonality system described above permits drive pinions and driven gears to be common between such gear reducers in at least two ways. First, input gear sets of two-stage gear reducers in each size reducer may serve as intermediate gear sets for three-stage reducers (i.e., a1=d1, and a2=d2). In addition, input gear sets for two stage gear reducers of a first size may be used as input gear sets (preferably in modular input stages) of three-stage gear reducers of a larger size (i.e., a1=c2). Similar relationships are preferably provided between a number of the various stages in several different sizes of gear reducers in the family, thereby providing considerable range of gear reduction without a corresponding increase in the number of different parts.

While the embodiments illustrated in the FIGURES and described above are presently preferred, it should be understood that these embodiments are offered by way of example only and may be adapted to various other structures. For example, while the presently preferred embodiments for the gear reducers described above use helical gearing, the appended claims are intended to cover arrangements employing other types of gearing, such as worm gears, bevel gears, or combinations of different gearing types in different reduction stages. Moreover, the invention is not limited to use with foot-mounted or shaft-mounted gear reducers, but may be applied to a variety of different housing styles. Finally, while reference is made herein to two and three-stage gear reducers, the structures described and claimed herein are not intended to be limited to two or three-stage gear reducers, but should be understood as relating to gear reducers in general and to multi-stage and modular gear reducers in particular. Thus, to the extend that multi-stage (i.e., two, three or more stage) gear reducers utilize the features described above and recited in the appended claims, these are intended to fall within the scope of the present invention.

What is claimed is:

1. A gear reduction system comprising:

a two-stage gear reducer having a first input stage and a first output stage, the first input stage including a first drive pinion and a first driven gear intermeshing with the first drive pinion, the first output stage including a second drive pinion and a second driven gear intermeshing with the second drive pinion, the two-stage gear reducer being adapted to form a three-stage gear reducer having a second input stage, an intermediate stage and a second output stage, the second input stage including a third drive pinion intermeshing with a third driven gear, the intermediate stage including a fourth drive pinion intermeshing with a fourth driven gear, and the second output stage including a fifth drive pinion intermeshing with a fifth driven gear;

wherein the first drive pinion is substantially identical to the fourth drive pinion, and wherein the second input stage supports the fourth drive pinion.

2. The gear reduction system of claim 1, wherein the second input stage is a modular input stage configured for coupling to a gear reducer identical to the two-stage gear reducer.

3. The gear reduction system of claim 1, wherein the first drive pinion includes a shank for supporting the pinion.

4. The gear reduction system of claim 1, wherein the first drive pinion and the third drive pinion are supported by modular transmission adapters.

5. A gear reduction system comprising:

a first gear reduction unit of a first size, the first gear reduction unit having a first gear reduction stage including a first drive pinion and a first driven gear, and a second gear reduction stage coupled to the first gear reduction stage and including a second drive pinion and a second driven gear;

a first modular input stage including a third drive pinion and a third driven gear, the first modular input stage being configured for coupling to the first gear reduction unit, whereby the first gear reduction stage is converted to a first intermediate gear reduction stage;

a second gear reduction unit of a second size larger than the first size, the second gear reduction unit having a fourth gear reduction stage including a fourth drive pinion and a fourth driven gear, and a fifth gear reduction stage coupled to the fourth gear reduction stage and including a fifth drive pinion and a fifth driven gear; and a second modular input stage including a sixth drive pinion and a sixth driven gear, the second modular input stage configured for coupling to the second gear reduction unit, whereby the fourth gear reduction stage forms a second intermediate gear reduction stage;

wherein the first drive pinion is used in both the first gear reduction stage and the first intermediate gear reduction stage and is substantially identical to the sixth drive pinion.

6. The gear reduction system of claim 5, wherein the fourth drive pinion is used in both the fourth gear reduction stage and the second intermediate gear reduction stage.

7. The gear reduction system of claim 5, further comprising a modular transmission adapter configured for coupling to either the first gear reduction unit to drive the first drive pinion or to the second modular input stage to drive the sixth pinion.

8. The gear reduction system of claim 5, wherein the first driven gear is used in both the first gear reduction stage and the first intermediate gear reduction stage and is substantially identical to the sixth driven gear.

9. The gear reduction system of claim 5, further comprising first and second modular transmission adapters configured for coupling to the first and second gear reduction units, respectively, for driving the first and fourth drive pinions.

10. The gear reduction system of claim 9, wherein the first and second modular transmission adapters support the first and fourth drive pinions, respectively.

11. The gear reduction system of claim 9, wherein the first modular transmission adapter is configured for coupling to either the first gear reduction unit or to the second modular input stage.

12. The gear reduction system of claim 5, wherein each of the first and fourth drive pinions includes a shank for support in the system.

13. The gear reduction system of claim 5, wherein the first and second gear reduction units are two-stage gear reducers.

14. A gear reduction system comprising:

a two-stage gear reducer having a first input stage and a first output stage, the first input stage including a first drive pinion and a first driven gear intermeshing with the first drive pinion, the first output stage including a second drive pinion and a second driven gear intermeshing with the second drive pinion, the two-stage gear reducer being adapted to form a three-stage gear reducer having a second input stage, an intermediate stage and a second output stage, the second input stage including a third drive pinion intermeshing with a third driven gear, the intermediate stage including a fourth drive pinion intermeshing with a fourth driven gear, and the second output stage including a fifth drive pinion intermeshing with a fifth driven gear;

wherein the first drive pinion is substantially identical to the fourth drive pinion, and wherein the first drive pinion and the third drive pinion are support by modular transmission adapters.

15. The gear reduction system of claim 14, wherein the second input stage is a modular input stage configured for coupling to a gear reducer identical to the two-stage gear reducer.

16. The gear reduction system of claim 14, wherein the first drive pinion includes a shank for supporting the pinion.

17. The gear reduction system of claim 14, wherein the second input stage supports the fourth drive pinion.

* * * * *